(12) United States Patent
Schildt et al.

(10) Patent No.: US 11,892,840 B2
(45) Date of Patent: Feb. 6, 2024

(54) GUST LOAD REDUCTION IN AN AIRCRAFT

(71) Applicant: Rolls-Royce Deutschland Ltd & Co KG, Blankenfelde-Mahlow (DE)

(72) Inventors: Philipp Schildt, Hirschaid (DE); Anton Dilcher, Erlangen (DE); Pascal Kolem, Kirchehrenbach (DE); Olaf Otto, Ottobrunn (DE); Frederic Pflaum, Erlangen (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 223 days.

(21) Appl. No.: 17/291,998

(22) PCT Filed: Nov. 5, 2019

(86) PCT No.: PCT/EP2019/080192
§ 371 (c)(1),
(2) Date: May 6, 2021

(87) PCT Pub. No.: WO2020/094617
PCT Pub. Date: May 14, 2020

(65) Prior Publication Data
US 2021/0311473 A1    Oct. 7, 2021

(30) Foreign Application Priority Data

Nov. 9, 2018   (DE) ..................... 10 2018 219 179.4

(51) Int. Cl.
*B64D 31/06*   (2006.01)
*B64D 27/24*   (2006.01)
(Continued)

(52) U.S. Cl.
CPC ........... *G05D 1/0066* (2013.01); *B64C 13/16* (2013.01); *B64D 27/24* (2013.01); *B64D 31/06* (2013.01)

(58) Field of Classification Search
CPC ........... B64C 3/52; B64C 13/16; B64D 27/06; B64D 27/24; B64D 31/06; B64D 2045/0085; G05D 1/0204; G05D 1/0066
See application file for complete search history.

(56) References Cited

U.S. PATENT DOCUMENTS 3,448,948 A    6/1969   Reerink
4,479,620 A *  10/1984  Rogers ...................... B64C 9/00
                                                     244/90 R
(Continued)

FOREIGN PATENT DOCUMENTS

DE   102015215130 A1   2/2017
DE   102016117638 A1   3/2018
(Continued)

OTHER PUBLICATIONS

Speas, Rebecca Barnett, "The functional application of the propeller load curve for fixed pitch propellers", Masters Thesis, University of Tennessee, Knoxville, Dec. 2006, 50 pages (Year: 2006).*
(Continued)

*Primary Examiner* — David A Testardi
(74) *Attorney, Agent, or Firm* — Lempia Summerfield Katz LLC

(57) ABSTRACT

An automated method for influencing a gust load of an aircraft is provided. A torque at least of an electromotive thrust generating unit arranged on a wing of the aircraft is modified such that a root bending torque of the wing generated by the gust load is reduced. An associated apparatus, an aircraft, a computer program product, and a computer-readable medium for carrying out the method are also provided.

14 Claims, 2 Drawing Sheets

(51) Int. Cl.
  *B64C 13/16* (2006.01)
  *G05D 1/00* (2006.01)

(56) References Cited

U.S. PATENT DOCUMENTS

| | | | |
|---|---|---|---|
| 4,796,192 A | | 1/1989 | Lewis |
| 6,095,459 A | * | 8/2000 | Codina ..................... B64C 9/32 244/76 A |
| 9,751,614 B1 | * | 9/2017 | Nguyen .................. B64C 15/02 |
| 10,144,503 B1 | * | 12/2018 | Vander Lind ....... B64C 29/0025 |
| 11,059,569 B1 | * | 7/2021 | Nguyen .................... B64C 3/50 |
| 2003/0080243 A1 | * | 5/2003 | Hoisignton ........... B64C 1/0009 244/13 |
| 2003/0234324 A1 | * | 12/2003 | Kubica ................... B64C 13/16 244/195 |
| 2004/0079835 A1 | * | 4/2004 | Volk .......................... B64C 9/22 244/76 C |
| 2004/0104302 A1 | | 6/2004 | Schierenbeck |
| 2005/0035242 A1 | * | 2/2005 | Nugent ................... B64D 31/06 244/175 |
| 2008/0265104 A1 | * | 10/2008 | Fabre-Raimbault ......................... G05D 1/0623 244/76 C |
| 2009/0048723 A1 | * | 2/2009 | Nugent ................... B64C 13/16 701/10 |
| 2009/0084908 A1 | * | 4/2009 | Wildschek ........... G05D 1/0066 244/76 R |
| 2015/0021443 A1 | * | 1/2015 | Wildschek ........... B64D 45/00 244/76 C |
| 2015/0028162 A1 | * | 1/2015 | Wildschek ............... G05D 1/00 244/76 C |
| 2015/0136897 A1 | * | 5/2015 | Seibel .................... B64D 27/24 244/6 |
| 2015/0144742 A1 | * | 5/2015 | Moxon .................... B64C 11/00 244/65 |
| 2016/0083075 A1 | * | 3/2016 | Moxon .................. B64D 45/00 244/13 |
| 2016/0325829 A1 | * | 11/2016 | Ahn ....................... A63H 27/12 |
| 2016/0365810 A1 | * | 12/2016 | Armstrong ................ H02P 3/18 |
| 2017/0253342 A1 | * | 9/2017 | De Magalhães Gomes ................. B64D 27/24 |
| 2018/0105280 A1 | | 4/2018 | Schmidt |
| 2018/0141641 A1 | * | 5/2018 | Griffin ................. G05D 1/0204 |
| 2018/0305033 A1 | * | 10/2018 | Joubert ................ G05D 1/0072 |
| 2019/0176970 A1 | * | 6/2019 | Gambioli .................. B64C 5/10 |
| 2019/0256195 A1 | * | 8/2019 | van der Linden ...... B64C 13/16 |
| 2019/0291863 A1 | * | 9/2019 | Lyasoff .................. B64D 27/24 |
| 2019/0375493 A1 | * | 12/2019 | Schwindt ........... B64D 45/0005 |
| 2020/0164976 A1 | * | 5/2020 | Lovering .............. B64D 27/24 |
| 2020/0164995 A1 | * | 5/2020 | Lovering .............. B64C 39/024 |
| 2021/0179259 A1 | * | 6/2021 | Ho ......................... B64C 13/16 |
| 2022/0041268 A1 | * | 2/2022 | Ivanco ................... B64C 13/18 |
| 2023/0117551 A1 | * | 4/2023 | Ho ....................... G05D 1/0066 244/195 |

FOREIGN PATENT DOCUMENTS

| | | | | |
|---|---|---|---|---|
| EP | 1854717 A1 | * | 11/2007 | ............. B64C 13/16 |
| EP | 3000722 A1 | | 3/2016 | |
| KR | 1020170122561 A | * | 11/2017 | ............. B64D 27/18 |
| WO | WO-9411248 A1 | * | 5/1994 | ............. B64D 27/18 |
| WO | 2018050866 A1 | | 3/2018 | |
| WO | WO-2021065180 A1 | * | 4/2021 | |

OTHER PUBLICATIONS

KIPO machine translation of KR 1020170122561 (original KR document published Nov. 6, 2017) (Year: 2017).*
EPO machine translation of KR 20170122561 (equiv. KR 1020170122561, original KR document published Nov. 6, 2017) (Year: 2017).*
M.I.T., "Wing Bending Calculations", Lab 10 Lecture Notes, M.I.T. Undergraduate Course 16.01, Unified Engineering, I, II, III, & IV, Fall-2005-Spring-2006, 6 pages (Year: 2006).*
Anonymous, "Speed Control Methods of Various Types of Speed Control Motors", Jun. 25, 2018, pp. 1-4.Retrieved from:URL: https://web.archive.org/web/20180625122935/http://www.orientalmotor.com/brushless-dc-motors-gear-motors/technology/speed-control-methods-of-speed -control-motors.html.
German Office Action for German Application No. 10 2018 219 179.4 dated Jul. 9, 2019.
Written Opinion of the International Research Authority for International Patent Application No. PCT/EP2019/080192 dated May 14, 2020.

* cited by examiner

GUST LOAD REDUCTION IN AN AIRCRAFT

This application is the National Stage of International Application No. PCT/EP2019/080192, filed Nov. 5, 2019, which claims the benefit of German Patent Application No. DE 10 2018 219 179.4, filed Nov. 9, 2018. The entire contents of these documents are hereby incorporated herein by reference.

FIELD

The present embodiments relate to influencing a gust load of an airplane.

BACKGROUND

During flight through gusts of wind, airplane support structures and passengers are subjected to intense loads by accelerations and resulting wing bending moments. This reduces a service life through material fatigue, and significant overdimensioning in relation to static load situations is necessary, leading to a heavy structure and thus to poor efficiency and life-cycle assessment.

The wing (e.g., aerofoil) is a component of an airplane and has the primary task of generating dynamic lift. The function of the wing is to generate a sufficiently large force perpendicular to the incident-flow direction by influencing the surrounding flow. This force is the lift that keeps an airplane in the air.

On airplanes, wings are normally equipped with flaps by which the flight attitude, the lift, or the air resistance may be influenced. In large airplanes, engines are normally suspended on the wings.

Devices for reducing gust loads on an aircraft are known, for example, from the published patent application DE 10 2016 117 638 A1. The devices typically include an acceleration sensor that is arranged close to the center of gravity of the aircraft and serves for detecting accelerations of the aircraft caused by gusts. The additional acceleration owing to gusts is subtracted from a total acceleration that acts on the aircraft and is contributed to, for example, by accelerations of the aircraft during maneuvers. To compensate for the additional loads/additional accelerations on the aircraft generated by gusts, actuators that control aerodynamically active control surfaces of the aircraft are actively controlled such that the additional load of the gust is compensated. This reduces both the required total lift of the aircraft and the bending moment at the wing root (e.g., root bending moment).

Future aircraft (e.g., airplanes) will use electric motors to generate thrust. The published patent application DE 10 2015 215 130 A1 discloses, for example, a series hybrid drive system in which electrical energy is provided by a generator that is coupled to and driven by an internal combustion engine. The electrical energy is subsequently fed to an electric motor that converts the fed electrical energy into drive energy for a propulsion of the aircraft (e.g., a propeller).

SUMMARY AND DESCRIPTION

The scope of the present invention is defined solely by the appended claims and is not affected to any degree by the statements within this summary.

The present embodiments may obviate one or more of the drawbacks or limitations in the related art. For example, a solution that, compared to the prior art, allows an improved reduction of gust loads occurring on an aircraft is provided.

Further features, application possibilities, and advantages of the present embodiments emerge from the following description.

A first aspect of the present embodiments consists in reducing structural loads and occurring accelerations by a brief superimposition of a torque of an electromotive thrust generating unit that is used for generating propulsion. The superimposed torque is directed counter to the structural excitation by atmospheric turbulence (e.g., gusts).

The term "reduce" is used in the present context to be "reduce as far as possible". It may be possible to almost entirely eliminate the bending moment that acts on the wing at the wing root (e.g., root bending moment) owing to the introduction of load by a gust.

In the present case, the term "gust load" describes the additional force or the additional moment that occurs when a gust acts on the aircraft or on the wings.

An active gust load reduction through control surface deflection on the wings of an airplane may also reduce the occurring root bending moments, but the actuation speed of the control surfaces is limited by the actuation work associated therewith.

In the case of insufficient authority of the system (e.g., the torque is smaller than the root bending moment induced by the gust) or in the case of non-ideal compensation of the additional moment, the present embodiments are, however, advantageous in that the structural oscillation induced by the gust is actively damped. This increases the service life of the structure of the airplane, since the number of vibration cycles is reduced, and passenger comfort is increased.

The present embodiments include an automated method for influencing a gust load of an airplane, where the torque of at least one electromotive thrust generating unit arranged on a wing of the airplane is changed such that the root bending moment of the wing generated by the gust load is reduced.

The present embodiments offer the advantage of modulating the torque of an electromotive thrust generating unit, where the closed-loop control speed is limited practically only by the closed-loop control speed of an inverter connected upstream of the thrust generating unit, and is thus faster, by several orders of magnitude, than by control surface deflections.

In one development, a value proportional to the root bending moment generated by the gust load may be ascertained by a sensor system. Closed-loop control of the torque of the electromotive thrust generating unit is thus possible.

In one development, the proportional value may be the acceleration of the wing perpendicular to the wing, and the acceleration may be adjusted by closed-loop control toward zero. This allows simple and robust closed-loop control.

It is also possible for the sensor system to look ahead in the direction of flight with the aid of sensors (e.g., camera, lidar, radar, sonar, air pressure sensor, etc.) and to commence the closed-loop control before the gust impinges on the airplane.

In a further embodiment, the change in the torque of the electromotive thrust generating unit may be performed by a change in the electrical current strength with which the electromotive thrust generating unit is fed. Fast and robust closed-loop control of the torque is thus possible, because the torque is proportional to the electrical power, which is proportional to the electrical current strength.

In a second aspect, the method is implemented with the aid of an open-loop and closed-loop control unit. The open-loop and closed-loop control unit may, for example, be a microcontroller.

The present embodiments include a device for influencing a gust load of an airplane. The device includes at least one electromotive thrust generating unit arranged on a wing of the airplane, and an open-loop and closed-loop control unit that changes the torque of the electromotive thrust generating unit, such that the root bending moment of the wing generated by the gust load is reduced.

In one development, a sensor system may ascertain a value proportional to the root bending moment generated by the gust load. The proportional value is fed, for example, to a proportional-derivative (PD) controller implemented in the open-loop and closed-loop control unit.

In one development, the device also includes at least one acceleration sensor of the sensor system, which measures the acceleration of the wing perpendicular to the wing as the proportional value, and the open-loop and closed-loop control unit, which adjusts the acceleration by closed-loop control toward zero. This makes possible a simple control loop that may be of very sensitive configuration.

In a further refinement, the device includes an inverter that is controlled in closed-loop fashion by the open-loop and closed-loop control unit. The inverter supplies electrical energy to the electromotive thrust generating unit, where a change in the electrical current strength at the output of the inverter causes the change in the torque of the electromotive thrust generating unit. The inverter, as a variant of an electrical current converter, is a known and proven device for closed-loop control of electric motors with regard to torque and speed.

In a further refinement, the device includes an electric motor in the electromotive thrust generating unit and includes a propeller driven by the electric motor, or a turbine driven by the electric motor, in the electromotive thrust generating unit. This allows the propulsion or the thrust for the airplane to be generated on the ground and in the air.

In a third aspect, the present embodiments include an airplane with a device according to the present embodiments. In the present case, the "airplane" may be an aircraft that is heavier than air and generates dynamic lift required for flight via non-rotating lift surfaces.

In a fourth aspect, a computer program product and a computer-readable medium (e.g., a non-transitory computer-readable storage medium) for carrying out the method according to the present embodiments are presented.

The present embodiments include a computer program product, including a computer program, where the computer program may be loaded into a memory device of an open-loop and closed-loop control unit. The acts of a method according to the present embodiments are carried out using the computer program when the computer program is executed on the open-loop and closed-loop control unit.

The present embodiments also include a computer-readable medium (e.g., a non-transitory computer-readable storage medium) on which a computer program is stored, where the computer program may be loaded into a memory device of an open-loop and closed-loop control unit. The acts of a method according to the present embodiments are carried out using the computer program when the computer program is executed on the open-loop and closed-loop control unit.

Further special features and advantages of the present embodiments will become clear from the following explanations of exemplary embodiments with reference to schematic drawings.

DETAILED DESCRIPTION

Figure 1:
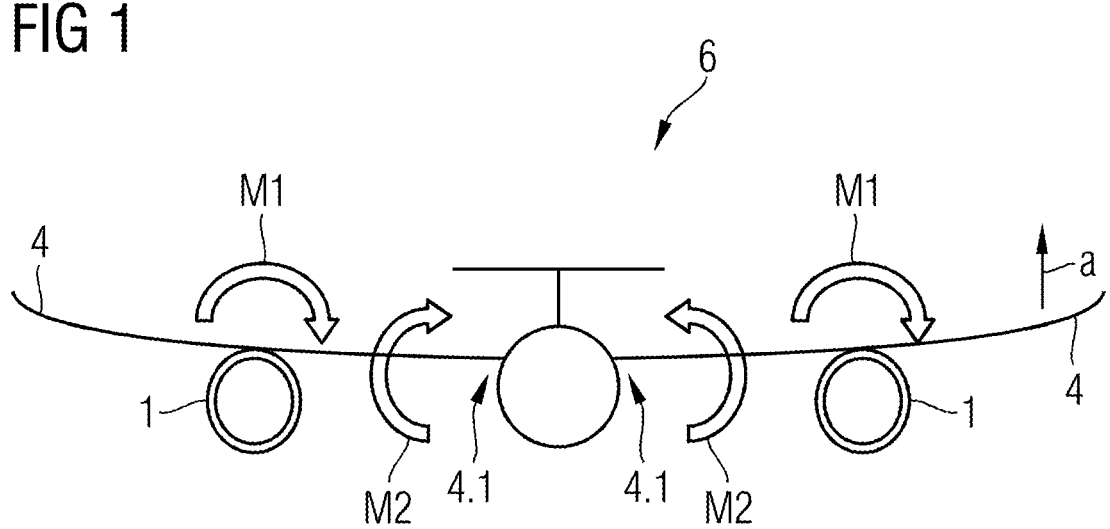
FIG. 1 shows a front view of one embodiment of an airplane.

FIG. 1 shows one embodiment of an airplane 6 from the front, with two wings 4 and two electromotive thrust generating units 1 attached thereto. The at least two electromotive thrust generating units 1 are responsible for the thrust or the propulsion of the airplane 6. The electromotive thrust generating units 1 have a torque M1 that introduces an opposing torque into the wings 4. The opposing torque seeks to bend the wings 4 upward and thus causes a bending moment at a wing root 4.1.

Gusts give rise to gust loads on the wings 4. The gust loads cause a root bending moment M2 at the wing roots 4.1. By changing the torque M1 of the electromotive thrust generating unit 1, the root bending moment M2 may be changed (e.g., almost compensated).

Figure 2:
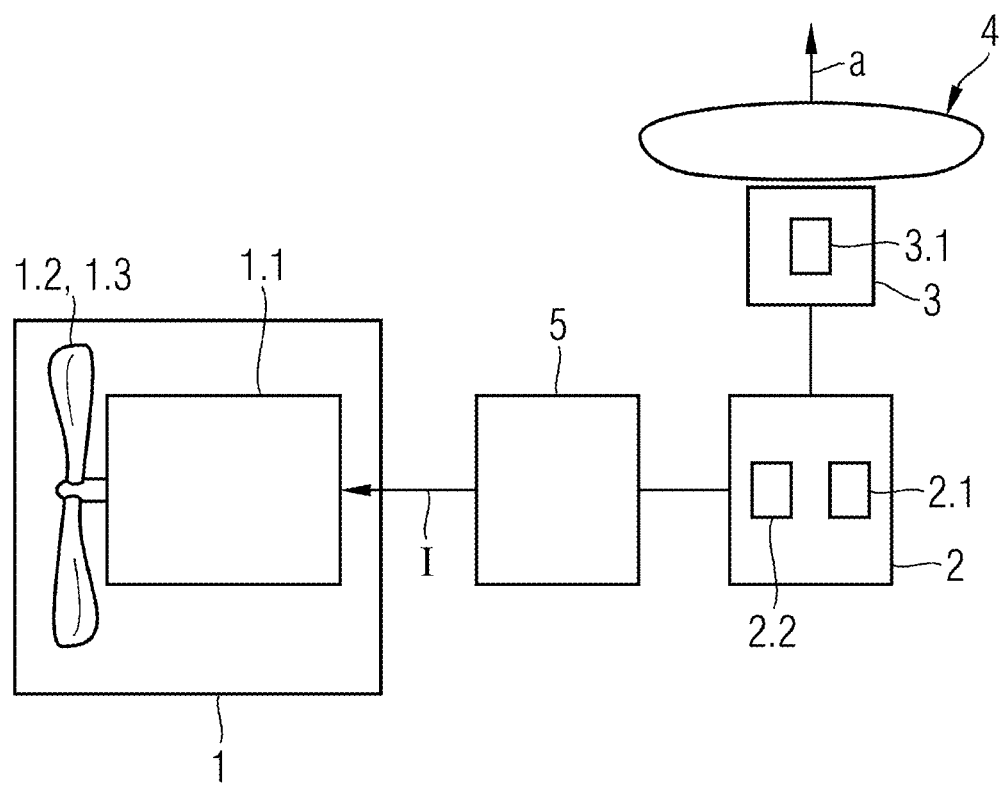
FIG. 2 shows a block diagram of one embodiment of a device for influencing a gust load of an airplane.

FIG. 2 shows a block diagram relating to FIG. 1. A sensor unit 3 with an acceleration sensor 3.1 that measures a vertical acceleration a of the wing 4 caused by a gust load is seated on the wing 4. The root bending moment M2 is proportional to the acceleration a. In other words, the acceleration a is a measure of the value of the root bending moment M2. The sensor unit 3 sends the acceleration values to an open-loop and closed-loop control unit 2 that is connected to an inverter 5 and changes or modulates an electrical current I at an output of the inverter 5. The electrical current I is supplied to an electric motor 1.1 of the electromotive thrust generating unit 1. The electric motor 1.1 drives a propeller 1.2 or a turbine 1.3, which causes the thrust.

Using a PD controller 2.1 in the open-loop control and evaluation unit 2, it is sought to reduce the acceleration a caused by the gust load by changing the electrical current I. The torque M1 of the electric motor 1.1 is proportional to the electrical current I. By changing the torque M1, the root bending moment M2 caused by the gust load may be reduced. Simulations of this may be found in the diagrams of FIG. 3 and FIG. 4. The program sequence for the method for gust load reduction is stored in the memory device 2.2 of the open-loop and closed-loop control unit 2.

Figure 3:
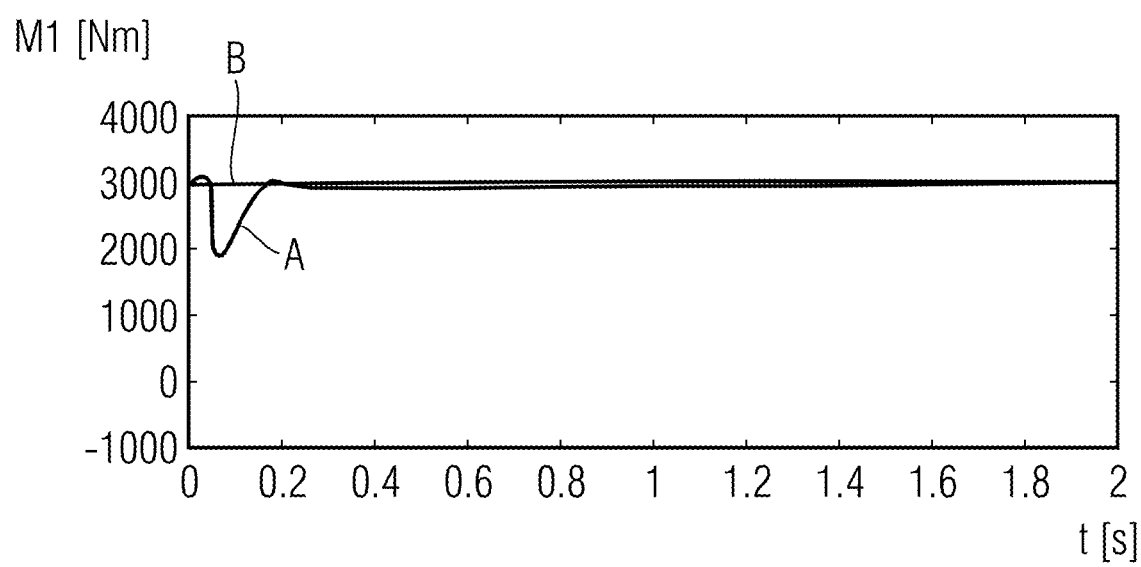
FIG. 3 shows an exemplary diagram of the torque of the electromotive thrust generating unit.

FIG. 3 shows a diagram in curve A of the course of the torque M1 in Nm of the electromotive thrust generating unit 1 with a reduction of a brief gust load via a temporary reduction of the torque M1. The torque M1 is reduced by approximately 1000 Nm at 0.1 s. The course is illustrated versus the time t in s. Curve B shows the course of the torque M1 without a reduction of the gust load. The effect of the torque reduction is clear from FIG. 4.

Figure 4:
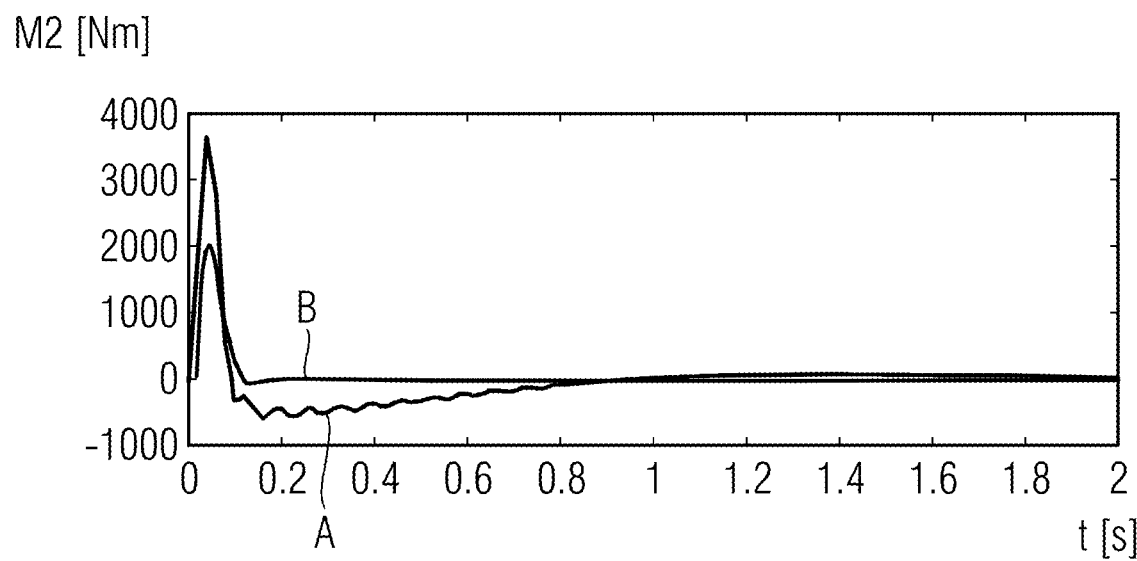
FIG. 4 shows an exemplary diagram of a root bending moment.

FIG. 4 shows a diagram of the root bending moment M2 in Nm versus the time t in s. Curve B shows the root bending moment M2 caused by the brief gust load without reduction via an opposing torque. Curve A shows the effectiveness of the reduction by way of the torque M1 as per FIG. 3. The root bending moment M2 may thus be reduced by almost 2000 Nm.

Although the invention has been described and illustrated more specifically in detail by the exemplary embodiments, the invention is not restricted by the disclosed examples, and other variations may be derived therefrom by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An automated method for influencing a gust load of an airplane, the automated method comprising:
   ascertaining, by a sensor system, an acceleration of a wing of the airplane perpendicular to the wing, the wing having a wing root, and the acceleration being a value proportional to a root bending moment of the wing generated by the gust load; and
   changing a torque of at least one electromotive thrust generator arranged on the wing of the airplane based on the ascertained acceleration, such that an opposing torque introduced into the wing by the changing of the torque causes a bending moment at the wing root to compensate for the root bending moment of the wing generated by the gust load, such that the root bending moment of the wing generated by the gust load is reduced via the opposing torque.

2. The method of claim 1, wherein changing the torque based on the ascertained acceleration comprises changing the torque based on closed-loop control of the acceleration toward zero.

3. The method of claim 1, wherein changing the torque of the at least one electromotive thrust generator comprises changing an electrical current with which the at least one electromotive thrust generator is fed.

4. A device for influencing a gust load of an airplane, the airplane having at least one electromotive thrust generator arranged on a wing of the airplane, the device comprising:
   a sensor system that is configured and programmed to ascertain an acceleration of the wing of the airplane perpendicular to the wing, the wing having a wing root, and the acceleration being a value proportional to a root bending moment of the wing generated by the gust load; and
   a controller configured and programmed to change a torque of the at least one electromotive thrust generator based on the ascertained acceleration, such that an opposing torque introduced into the wing by the change of the torque causes a bending moment at the wing root to compensate for the root bending moment of the wing generated by the gust load, such that the root bending moment of the wing generated by the gust load is reduced via the opposing torque.

5. The device of claim 4, wherein the controller is configured and programmed to change the torque based on closed-loop control of the acceleration toward zero.

6. The device of claim 4, further comprising an inverter that is controlled in closed-loop fashion by the controller, the inverter being configured to supply electrical energy to the at least one electromotive thrust generator,
   wherein a change in an electrical current at an output of the inverter causes the change in the torque of the at least one electromotive thrust generator.

7. The device of claim 4, further comprising:
   an electric motor of the at least one electromotive thrust generator; and
   a propeller driven by the electric motor or a turbine driven by the electric motor of the at least one electromotive thrust generator.

8. An airplane comprising:
   at least one electromotive thrust generator arranged on a wing of the airplane; and
   a device for influencing a gust load of the airplane, the device comprising:
      a sensor system that is configured and programmed to ascertain an acceleration of the wing of the airplane perpendicular to the wing, the wing having a wing root, and the acceleration being a value proportional to a root bending moment of the wing generated by the gust load; and
      a controller configured and programmed to change a torque of the at least one electromotive thrust generator based on the ascertained acceleration, such that an opposing torque introduced into the wing by the change of the torque causes a bending moment at the wing root to compensate for the root bending moment of the wing generated by the gust load, such that the root bending moment of the wing generated by the gust load is reduced via the opposing torque.

9. The airplane of claim 8, wherein the controller is configured and programmed to change the torque based on closed-loop control of the acceleration toward zero.

10. The airplane of claim 8, wherein the device further comprises an inverter that is controlled in closed-loop fashion by the controller, the inverter being configured to supply electrical energy to the at least one electromotive thrust generator, and
   wherein a change in an electrical current at an output of the inverter causes the change in the torque of the at least one electromotive thrust generator.

11. The airplane of claim 8, wherein the device further comprises:
   an electric motor of the at least one electromotive thrust generator; and
   a propeller driven by the electric motor of the at least one electromotive thrust generator or a turbine driven by the electric motor of the at least one electromotive thrust generator.

12. A non-transitory computer-readable storage medium that stores instructions executable by a controller to influence a gust load of an airplane, such that the instructions cause the controller to perform:
   ascertaining, by a sensor system, an acceleration of a wing of the airplane perpendicular to the wing, the wing having a wing root, and the acceleration being a value proportional to a root bending moment of the wing generated by the gust load; and
   changing a torque of at least one electromotive thrust generator arranged on the wing of the airplane based on the ascertained acceleration, such that an opposing torque introduced into the wing by the changing of the torque causes a bending moment at the wing root to compensate for the root bending moment of the wing generated by the gust load, such that the root bending moment of the wing generated by the gust load is reduced via the opposing torque.

13. The non-transitory computer-readable storage medium of claim 12, wherein the instructions further cause the controller to perform: changing the torque based on closed-loop control of the acceleration toward zero.

14. The non-transitory computer-readable storage medium of claim 12, wherein the changing in the torque of the at least one electromotive thrust generator is performed by a change in an electrical current with which the at least one electromotive thrust generator is fed.

* * * * *